3,304,297
DYESTUFFS CONSISTING OF ORGANIC DYE-STUFFS BOUND TO POLYHYDROXYLATED ORGANIC POLYMERS
Jacques Wegmann, Heinz Hefti, and Carl Becker, Basel, and Henri Riat, Arlesheim, Switzerland, assignors to Ciba Limited, Basel, Switzerland, a Swiss company
No Drawing. Filed Nov. 27, 1962, Ser. No. 240,412
Claims priority, application Switzerland, Feb. 12, 1959, 69,474/59; June 18, 1959, 74,592/59; Jan. 12, 1960, 254/60; Mar. 18, 1960, 3,066/60
6 Claims. (Cl. 260—153)

This application is a continuation-in-part application of application Serial No. 7,979, filed February 11, 1960 (now abandoned), and of application Serial No. 95,484, filed March 14, 1961 (now abandoned).

It is known that cellulose and cellulose derivatives in the form of fibrous textile materials, such as cotton, linen, viscose, etc., can be dyed with dyestuffs entering into chemical combination with the hydroxyl groups of the highly polymeric cellulose material (cf. e.g. U.S. Patents 1,886,480, 1,973,478, 2,741,532). It is also known that dyestuff intermediates can be made by reacting alkali cellulose with the difficulty obtainable and toxic para-amino-ω-chloracetophenone (U.S. Patent 2,727,034). The starting material there used for that reaction is not a cellulose derivative, but insoluble cellulose, which first has to be converted in a cumbersome process into alkali cellulose. The latter is subjected to reaction, for many hours, with the para-amino-ω-chloracetophenone, pure alcohol being used as medium on account of the insolubility in water of the latter. The resulting products have a color of their own and yield an insoluble high polymer on diazotization and coupling, which must be carboxymethylated so as to become soluble. The formed product is unsuitable for spin dyeing because the insoluble constituents present in large proportion clog filters and spinnerets. The situation is about the same with respect to the products described in U.S. Patent 2,136,377. The p-nitrobenzoic acid or the p-nitrobenzyl alcohol or their homologs or derivatives there used for the reaction are also insoluble in water, wherefore the reaction must take place in an organic solvent. Moreover, according to that patent, the nitro group(s) in the intermediates must be reduced before the intermediates are processed into dyestuffs. Such reduction does not proceed smoothly and gives but poor yields. The products obtained according to that patent, if they are to be made soluble, must be finely ground for a long period of time—which is not a desirable feature. Moreover, the viscose dyeings obtained therewith are not fast to light.

It has now been found that spinning masses can be dyed with highly polymeric dyestuffs in industrially satisfactory manner, without impairing the strength of the fiber, fast dyeings being obtained. However there are several prerequisites to be taken into account: As starting materials there are to be used cellulose derivatives (of organic compounds) and other polyhydroxylated polymeric materials, that is to say, not cellulose itself or its inorganic salts, such as alkali cellulose. Moreover, the chromophore has to be bound firmly, i.e. chemically, to the highly polymeric portion of the dyestuff. Another prerequisite is that the number of usable chromophores, i.e. of potential shades, should be as large as possible. Therefore, the reactive groups should not themselves be the intermediate of the dye (e.g. diazo component for the azo dye—as is the case with the two aforementioned U.S. patents) because that considerably reduces the number of potential shades. Above all, the reactive dyestuffs or intermediates used should be soluble in water or aqueous alkalies so that the reaction can at all be performed economically on an industrial scale, and that products are obtained that are either water-soluble or can be converted into a finely disperse, water-soluble form in a simple manner, to ensure good spinning and homogeneous colorings. Finally, the starting products must be so selected that powerful, pure dyeings are obtained which are fast to light. Accordingly, a number of conditions had to be considered and met to the greatest extent possible. They are substantially met by the dyes of the instant invention.

This invention thus provides valuable new stable dyestuff derivatives which are soluble in aqueous alkalies and/or in water and contain an organic dyestuff, or an intermediate product suitable for forming a dyestuff, chemically bound to the hydroxyl groups of a polyhydroxylated chain of high molecular weight. The invention provides more especially derivatives of polysaccharides, such as cellulose ethers, which derivatives have a high content, that is to say, more than 5% and advantageously between 10 and 400%, of dyestuff calculated on the polyhydroxylated material chemically bound to dyestuff.

The invention also provides a process for the manufacture of the aforesaid dyestuff derivatives, wherein a polyhydroxylated material other than cellulose itself that is soluble, insoluble or colloidally soluble in water or in aqueous alkalies is reacted in an aqueous medium and in the presence of an acid-binding agent with an organic dyestuff or an organic dyestuff intermediate e.g. an azo dyestuff intermediate product suitable for making dyestuffs, which dyestuff or intermediate product is capable of reacting with the hydroxyl groups of the polyhydroxylated material with the formation of a covalent bond, and, when a dyestuff former is used, the latter is converted, if desired after removing any unreacted dyestuff former, into dyestuff, preferably by coupling or by diazotization and coupling.

As polyhydroxylated material to be used as starting materials there are to be understood natural, modified natural or fully synthetic organic polymers, containing hydroxyl groups, with the exception of cellulose itself, and more especially nitrogen-free polymeric compounds, such as cellulose ethers or esters, preferably water-soluble and/or alkali soluble cellulose ethers or esters, that is to say, cellulose ethers which are soluble, for example, in caustic soda solution of 1–8% strength, such as cellulose methyl, ethyl or propyl ether, cellulose hydroxyethyl or hydroxylpropyl ether, carboxyalkyl-celluloses, and especially carboxymethylcellulose, the sulfuric acid monoester of hydroxyethylcellulose, the reaction product of cellulose with chloromethyl-phosphinic acid, polyvinyl alcohol, soluble polysaccharides such as soluble starches, dextrin, starch-sodium, glycollate, pectins, alginates, especially sodium alginate, gum arabic, guaran and like vegetable mucilaginous substances which consist of or contain a polyhydroxylated chain. Also useful are water-insoluble and alkali-insoluble cellulose ethers or esters, that is to say, for example, those which are insoluble in caustic soda solution of 1 to 8% strength, such as weakly carboxy-methylated and weakly phosphonomethylated cellulose, that is to say, reaction products of cellulose with chloracetic acid or chloromethyl-phosphinic acid having a degree of carboxymethylation or phosphonomethylation of about 0.04 to 0.4, and advantageously about 0.1 (which corresponds to 1 carboxymethyl group for every 10 glucose units). Among these, especially advantageous starting materials are, however, insoluble or colloidally soluble materials, for example: starches, such as wheat starch, potato starch or maize; gums such as tragacanth; and meals such as carob seed meal, cornflower seed meal, sunflower seed meal and soyabean seed meal.

As organic dyestuffs or dyestuff formers, which are capable of reacting with the hydroxyl groups of the aforesaid polyhydroxylated materials with the formation of a covalent chemical bond, there are advantageously used water-soluble organic dyestuff or diazo components or coupling components, which contain, in addition to the reactive groups carboxyl groups or more especially sulfonic acid groups. As reactive groups in this connection there may be mentioned, ethyleneimino groups, isothiocyanate groups, carbamic acid aryl ester groups, the propiolic acid amide group, acrylamino groups, vinyl-sulfone groups, and especially labile substituents which can easily be split off with the taking up of the electron pair of the bond, for example, aliphatically bound sulfuric acid ester groups and more especially aliphatically bound sulfonyloxy groups and halogen atoms, especially an aliphatically bound chlorine atom. Advantageously these labile substituents are present in the $\gamma$- or $\beta$-position of an aliphatic radical which is bound to the dyestuff molecule directly or through an amino, sulfone or sulfonic acid amide group. In the case of those dyestuffs which contain halogen atoms as labile substituents, such exchangeable halogen atoms may also be present in an aliphatic acyl radical for example, an acetyl radical, or in the $\beta$-position or the $\alpha$- and $\beta$-position of a propionyl radical or advantageously in a heterocyclic radical, for example, in a phthalazine, chinazoline, chinoxaline pyrimidine or preferably a triazine ring. The dyestuffs and dyestuff formers advantageously contain the grouping of the formula (1)
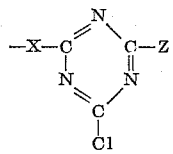

in which X represents a nitrogen bridge, and Z represents an advantageously substituted amino group, a substituted hydroxyl or mercapto group or a chlorine atom or an alkyl, aryl or aralkyl group.

Of special interest are dyestuffs which contain a grouping of the formula

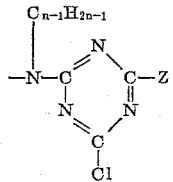

in which $n$ represents a whole number not greater than 4, and Z has the meaning given above.

All these reactive groups are characterized by their containing at least one hetero atom in the linking atom chain formed between the dyestuff moiety and the oxygen atom of the polyhydroxylated polymer after the reaction.

A very wide variety of organic dyestuffs can be used, for example, oxazine dyestuffs, triphenylmethane dyestuffs, xanthene dyestuffs, nitro-dyestuffs, acridone dyestuffs, perinone dyestuffs and especially azo-dyestuffs, anthraquinone dyestuffs, phthalocyanine dyestuffs and peridacarboxylic acid imide dyestuffs.

Among azo-dyestuffs there may be mentioned, for example, disazo- and trisazo-dyestuffs, but preferably monoazo-dyestuffs. Many such dyestuffs are known.

Among the anthraquinone dyestuffs there may be mentioned more especially dyestuffs derived from 1:4-diaminoanthraquinone-2-sulfonic acid. The manufacture of these and other anthraquinone dyestuffs is described in French Specification No. 1,182,124. As suitable phthalocyanine dyestuffs there may be mentioned more especially those derived from phthalocyanine sulfonic acid amides, which contain at least two free sulfonic acid groups and contain in at least one sulfonamide radical a group containing at least one labile halogen atom. The manufacture of such dyestuff is described in French specification No. 1,181,249.

Dyestuff formers which contain the aforesaid reactive groups or groupings are also largely known. The reaction of the reactive dyestuff (so-called reactive dyestuff) or dyestuff former with the polyhydroxylated material is carried out in aqueous suspension or advantageously aqueous solution, and advantageously in the presence of an inorganic acid-binding agent, such as an alkali metal bicarbonate or carbonate, an alkaliphosphate or preferably an alkali metal hydroxide or a mixture of such agents. In many cases it is of advantage first to allow the polyhydroxylated material to swell for a short time, in the solution or suspension of the reactive dyestuff or dyestuff former, and then to add the alkaline reaction medium while stirring. If necessary, the aqueous medium may be composed of a mixture of water with a suitable organic solvent in a ratio of up to one part by weight of solvent per each part by weight of water. As suitable solvents there may be mentioned the monoalkyl ethers of ethylene glycol, illustratively ethylene glycol monoethyl ether, ketones such as acetone, methylethyl ketone and methylisopropyl ketone, esters such as ethyl formate and formamide. The reaction is advantageously carried out at room temperature or a moderately raised temperature, for example, at 20–40° C. In this manner derivatives can be prepared having a high content of dyestuff, that is to stay, derivatives containing more than 5% and up to 400% or more of dyestuff calculated on the dry weight of the polyhydroxylated material used. Depending on the reactive compound chosen the reaction takes a longer or shorter time. In general, however, a high degree of reaction can be reached after one hour in the case of dyestuffs that react well, and after a few hours in the case of more slowly reacting dyestuffs.

After the reaction the product formed can be precipitated, for example, by the addition of alcohol or by neutralization and isolated from the reaction mixture by filtration. When a dyestuff former is used it is converted advantageously after being thoroughly washed to remove any non-chemically fixed dyestuff former, into dyestuff by the usual methods by condensation or coupling or diazotisation and coupling. This preparation of a colored derivative by the synthesis of the dyestuff after a component has been fixed on the polyhydroxylated material, as compared with the method in which the finished dyestuff is used for the reaction, has the advantage, on the one hand, that it is easier to remove any non-fixed starting materials and thereby obtain more unitary products, and, on the other, that a dyestuff derivative is obtained having a higher content of dyestuff than a derivative obtained by direct reaction with the appropriate dyestuff.

The colored dyestuff derivatives of this invention are essentially polyhydroxylated dyestuffs of high molecular weight which contain dyestuff radicals chemically bound to the hydroxyl groups of a polymeric chain.

Those polyhydroxylated dyestuffs of this invention which are not soluble in water can be brought into a very finely divided form which is usually structureless and enables them to be used, for example, for dope-dyeing viscous spinning compositions by suitably grinding or disintegrating with a ball mill or swing mill or so-called "Attritor mills" or in mills having a higher output in the presence of an agent, such as water or alcohol, in which the polyhydroxlylated dyestuff does not dissolve and is at most capable of swelling.

By the spin-dyeing, for example, of viscose silk or cuprammonium silk with the dyestuffs of the invention there are obtained, even with a water-soluble dyestuff derivative, dyeing that are fast to washing and, in contradistinction to the usual pigment dyeings, maintain their transparency and brilliance (avoidance of the so-called "greasy lustre" effect).

The dyestuffs of this invention can be used as pigments or for dyeing synthetic resins and glass fibers on which they generally have an excellent adhesion. By increasing the content of dyestuff the properties are changed and products are obtained that are generally soluble in water and/or in aqueous alkalies to form viscous solutions of colloidal character. They are useful for the manufacture of colored shaped structures, especially fibers, foils or foams, or for coloring various materials which, as compared with materials colored with the usual dyestuffs yielding transparent dyeings, are distinguished by their better properties of fastness, especially their better properties of wet fastness, coupled with the full preservation of their transparency and brilliance.

The following examples illustrate the invention, the parts and percentages being by weight:

Example 1

40 parts of wheat starch are stirred into a mixture of 120 parts of water, 80 parts of sodium chloride and 18.8 parts of the compound of the formula

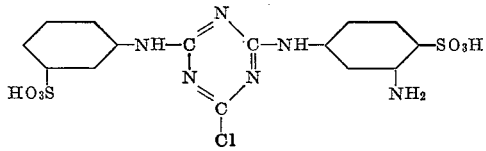

The mixture is stirred for 15 minutes, then treated with 30 parts of sodium hydroxide solution of 30% strength and stirred on until it forms a thick paste. After 24 hours the solid reaction product is disintegrated, introduced into 1000 parts of water, rendered acid to Congo red with hydrochloric acid, filtered, and the filter residue is thoroughly washed with water containing hydrochloric acid (1 part by volume of concentrated hydrochloric acid to 100 parts by volume of water).

The resulting filter cake is finely disintegrated, introduced into a solution of 10 parts of concentrated hydrochloric acid in 200 parts of water, and the whole is treated with 2 N-sodium nitrite solution at 0 to 10° C. until the potassium iodide starch reaction appears, then rendered alkaline with sodium bicarbonate, and a solution of 50 parts of 1-benzoylamino-8-hydroxynaphthalene-3:6-disulfonic acid and 30 parts of sodium bicarbonate in 2000 parts of water is added. After 5 hours the suspension is rendered acid to Congo red with hydrochloric acid, filtered, and the filter cake is thoroughly washed with a solution of 1 part by volume of concentrated hydrochloric acid per 100 parts by volume of water. The dyestuff is then finely disintegrated and introduced into alcohol; the mixture is neutralized with sodium hydroxide solution, filtered, and the dyestuff derivative is rinsed with alcohol, dried and, if desired, ground. The chromophoric moiety constitutes about 45% of the molecule of the aforesaid derivative.

When in this example coupling components other than 1 - benzoylamino-8-hydroxynaphthalene - 3:6 - disulfonic acid are used, other dyestuffs are obtained, for example:

| | Coupling component | Shade |
|---|---|---|
| 1 | HO₃S-[naphthalene]-NH-CO-CH₃, HO- | Orange. |
| 2 | OH-[naphthalene]-SO₃H | Red-orange. |
| 3 | OH-[naphthalene](HO₃S-)(-SO₃H) | Do. |
| 4 | HO, NH₂-[naphthalene](HO₃S-)(-SO₃H)-N=N-[phenyl]-SO₃H | Dark-blue. |
| 5 | H₃C-C(=N-)(-N-)C-OH with CH bridge, -[phenyl]-SO₃H, Cl | Yellow. |
| 6 | H₃C-C(=N-)(-N-)C-OH with CH bridge, SO₃H, -[naphthalene]-HO₃S | Do. |

| | Coupling component | Shade |
|---|---|---|
| 7 | (2/3) [pyrazolone coupler structure with H₃C, C-OH, N-N-C₆H₄-SO₃H, Cl] and (1/3) [naphthalene coupler with HO, NH₂, HO₃S, SO₃H, -N=N-C₆H₄-SO₃H] | Green. |
| 8 | [NaO₃S-naphthalene(HO)-NH-C(triazine,Cl)-NH-C₆H₄-SO₃Na] | Orange. |
| 9 | [HO, NH-triazine(Cl)-NH-C₆H₄-SO₃Na, NaO₃S-naphthalene-SO₃Na] | Red. |

The dyestuffs listed above can be converted by wet grinding in alcohol into a generally amorphous form which gives in water and aqueous alkalies at least colloidal solutions.

*Example 2*

10 parts of the compound of the formula

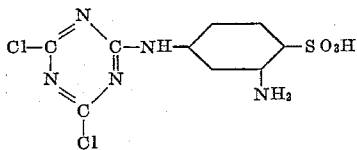

are dispersed in 60 parts of water and 10 parts of locust bean flour and 15 parts of sodium hydroxide solution of 15% strength are stirred in. After 3 hours the solid reaction mass is disintegrated, introduced into 1000 parts of water, and the suspension is neutralized with hydrochloric acid, filtered, and the filter cake is thoroughly rinsed. The chromophoric moiety constitutes about 40% of the molecule of the product.

Subsequent diazotization and coupling with the coupling components listed in the table in Example 1 yields derivatives that produce the shades shown in the table.

*Example 3*

10 parts of finely comminuted tragacanth are stirred into a suspension of 10 parts of the compound of the formula

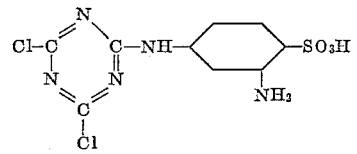

in 60 parts of water; the whole is allowed to swell overnight and 15 parts of sodium hydroxide solution of 15% strength are then kneaded in. After 3 hours the solid reaction mass is disintegrated, added to 1000 parts of water, the suspension is neutralized with hydrochloric acid, filtered, and the filter cake is thoroughly rinsed. The precursor moiety constitutes approximately 50% of the molecule of the product.

Subsequent diazotization and coupling with the coupling components listed in the table in Example 1 yields derivatives that produce the shades shown in the table.

*Example 4*

10 parts of slightly carboxymethylated aspen cellulose (1 COOH group per 25 glucose units) and 20 parts of sodium chloride are mixed with 70 parts of sodium hydroxide solution of 15% strength. The whole is allowed to swell for 1 hour and then mixed with 12 parts of finely comminuted sodium bicarbonate. After 10 minutes 4.72 parts of the compound of the formula

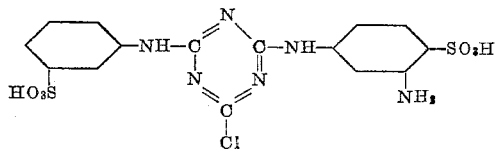

are added. After 24 hours the solid reaction product is disintegrated, added to 1000 parts of water, the suspension is rendered acid to Congo red with hydrochloric acid, filtered, and the filter cake is thoroughly washed with a solution containing 1 part by volume of concentrated hydrochloric acid per 100 parts by volume of water. The yield amounts to 70% calculated on the monochlortriazine intermediate used and the monochlortriazine moiety constitutes about 35% of the product.

Subsequent diazotization and coupling with the coupling components listed in the table in Example 1 yields derivatives that produce the shades shown in the table.

*Example 5*

20 parts of wheat starch are stirred with a high-speed stirrer into a mixture of 80 parts of water, 30 parts of sodium hydroxide solution of 15% strength and 40 parts of sodium chloride. The whole is allowed to swell for 30 minutes and 8 parts of 2-chloro-4-(β-aminoethyl)-amino-6-(2':5'-disulfophenyl) - amino - 1:3:5 - triazine are then mixed with the well swollen mass, which is then left to itself for 20 hours, disintegrated, added to 250 parts of water, then neutralized with 2 N-hydrochloric acid and mixed with an equal volume of ethanol. The reaction product which flocks out is filtered off, thoroughly washed with alcohol of 50% strength, dried and ground.

A mixture of 5 parts of the resulting reaction product and 1 part of powdered copper phthalocyanine-3:3':3'':3'''-tetrasulfonyl chloride is suspended in 25 parts of dimethylformamide. After 15 minutes, 25 parts of water and 1 part by volume of concentrated ammonia are stirred in. 1 part by volume of concentrated ammonia is added after 3 hours, and after a further 3 hours another such addition is made. The whole is kept overnight, added to 250 parts of water, the resulting suspension is rendered acid to Congo red with hydrochloric acid, filtered, and the filter cake is thoroughly rinsed with a solution containing 1 part by volume of concentrated hydrochloric acid per 100 parts by volume of water. The filter cake is then suspended in alcohol, neutralized with sodium hydroxide solution, filtered off and dried.

The resulting dark-blue substance is converted into a water-soluble form by wet grinding in alcohol.

*Example 6*

40 parts of wheat starch are stirred into a mixture of 120 parts of water, 80 parts of sodium chloride and 20 parts of the dyestuff of the formula

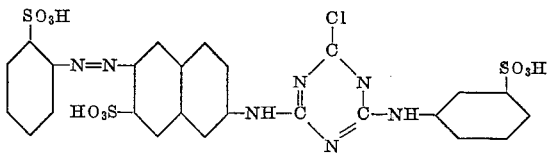

The whole is stirred for 30 minutes and 30 parts of sodium hydroxide solution of 30% strength are then added, and the mixture is stirred on until it forms a paste. After 24 hours the reaction mixture is added to 1000 parts of water, the suspension is rendered acid to Congo red with hydrochloric acid, filtered, and the filter residue is thoroughly rinsed with a solution containing 1 part by volume of concentrated hydrochloric acid per 100 parts by volume of water; it is then finely comminuted and introduced into alcohol. The mixture is neutralized with sodium hydroxide solution, filtered, and the dyestuff derivative is rinsed with alcohol, dried and, if desired, ground. The derivative is comprised of approximately 15% of the chromophoric moiety.

A product of dark-orange color is obtained which can be converted into the water-soluble form, for example, in the following manner:

A mixture of 25 parts of the polyhydroxylated dyestuff and 250 parts of alcohol is ground in a ball mill or swing mill until the product is soluble in water. The alcohol is then evaporated and the remaining dry dyestuff, may, if desired, be once more ground in the dry state.

*Example 7*

10 parts of wheat starch are stirred into a mixture of 40 parts of water, 10 parts of sodium chloride and 18 parts of the tri-sodium salt of the compound of the formula

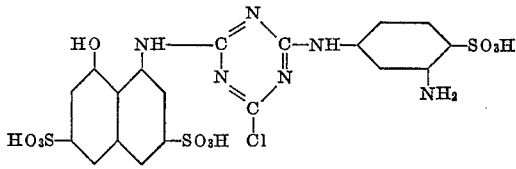

The whole is stirred for 30 minutes, treated with 15 parts of sodium hydroxide solution of 30% strength, and stirred on until it forms a paste, which is kept for 24 hours and then dispersed in 500 parts of water. The suspension is rendered acid to Congo red with hydrochloric acid, filtered, and the filter cake is rinsed with a solution of 1 part by volume of concentrated hydrochloric acid per 100 parts by volume of water.

The filter cake is added to a solution cooled to 0–5° C. and rendered alkaline with sodium bicarbonate, of 6 parts of diazotized 2-aminobenzene-1-sulfonic acid in 200 parts of water; the whole is stirred for 4 hours, and then rendered acid to Congo red with hydrochloric acid. The red precipitate is filtered off and washed with water containing hydrochloric acid as described above. The washed filter cake is dispersed in a solution of 10 parts of concentrated hydrochloric acid in 200 parts of water, and at 0 to 10° C. treated with N-sodium nitrite solution until the potassium iodide starch reaction appears. The whole is then alkalinized with sodium bicarbonate and a solution of 13 parts of 1-benzoylamino-8-hydroxynaphthalene-3:6-disulfonic acid and 20 parts of sodium bicarbonate in 500 parts of water is added. After 5 hours the suspension is isolated and further worked up as described in Example 1.

By varying the diazo and coupling components there can be prepared by the process described above, for example, the following dyestuffs:

| | Diazo component | Coupling component | Shade |
|---|---|---|---|
| 1 | 1-aminobenzene-2-sulfonic acid. | 1-hydroxynaphthalene-4-sulfonic acid. | Red. |
| 2 | ----do---- | 1-(2'-naphthyl)-3-methyl-5-pyrazolone-4':8'-disulfonic acid. | Yellowish red. |
| 3 | 4-benzoylamino-2:5-dimethoxyaniline. | 1-hydroxynaphthalene-4-sulfonic acid. | Violet |
| 4 | ----do---- | 1-benzoylamino-8-hydroxynaphthalene-3:6-disulfonic acid. | Do. |
| 5 | ----do---- | 1-(2'-naphthyl)-3-methyl-5-pyrazolone-4':8'-disulfonic acid. | Green. |
| 6 | 2:5 dimethoxyaniline | 1-benzoylamino-8-hydroxynaphthalene-3:6-disulfonic acid. | Violet. |
| 7 | ----do---- | 1-hydroxynaphthalene-4-sulfonic acid | Do. |
| 8 | ----do---- | 1-(2' naphthyl)-3-methyl-5-pyrazolone-4':8'-disulfonic acid. | Brown. |
| 9 | Para-chloraniline | 1-hydroxynaphthalene-4-sulfonic acid. | Red. |
| 10 | ----do---- | 1-benzoylamino-8-hydroxynaphthalene-3:6-disulfonic acid. | Bluish red. |
| 11 | ----do---- | 1-(2'-naphthyl)-3-methyl-5 pyrazolone-4':8'-disulfonic acid. | Red. |
| 12 | Meta-toluidine | 1-hydroxynaphthalene-4-sulfonic acid | Red. |
| 13 | ----do---- | 1-benzoylamino-8-hydroxynaphthalene-3:6-disulfonic acid. | Bluish red |
| 14 | ----do---- | 1-(2'-naphthyl)-3-methyl-5-pyrazolone-4':8'-disulfonic acid. | Red. |

*Example 8*

10 parts of starch are stirred into a mixture of 30 parts of water, 20 parts of sodium chloride and 5 parts of the dyestuff of the formula

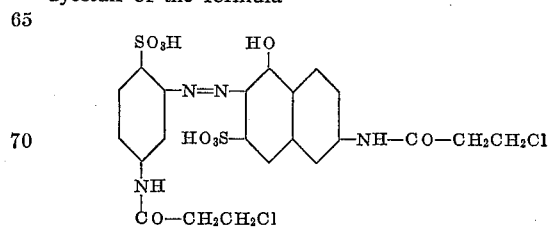

in the form of its disodium salt. The whole is stirred for 30 minutes, treated with 8 parts of sodium hydroxide solution of 30% strength and stirred on until it forms a paste which after 24 hours is introduced into 500 parts of water. The suspension of rendered acid to Congo red with hydrochloric acid, filtered, and the filter cake is thoroughly washed with a solution of 1 part by volume of concentrated hydrochloric acid per 100 parts by volume of water. It is then finely comminuted and introduced into alcohol; the mixture is neutralized with sodium hydroxide solution and filtered, and the dyestuff derivative is washed with alcohol and dried.

A substance of dark-orange color is obtained which can be converted into the water-soluble form, for example, by wet grinding in alcohol.

In the same manner the reaction can be performed with:

the reddish yellow dyestuff of the formula

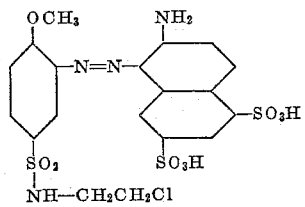

the blue dyestuff of the formula

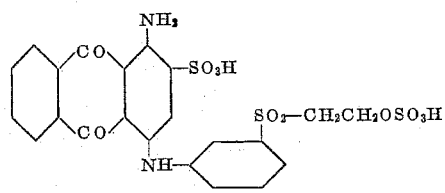

the reddish brown dyestuff of the formula

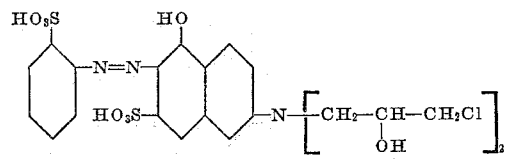

the yellow dyestuff of the formula

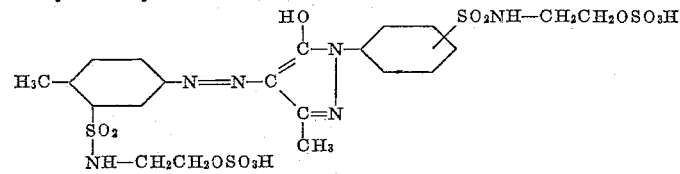

the yellow dyestuff of the formula

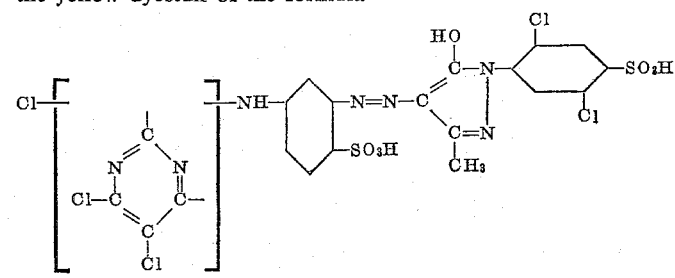

the yellow dyestuff of the formula

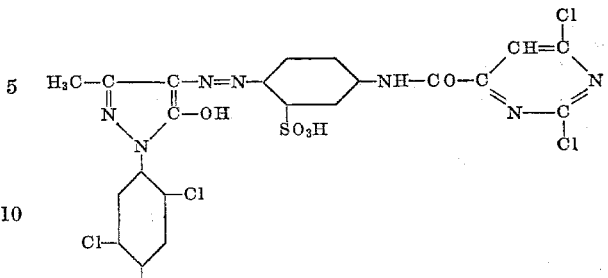

the yellow dyestuff of the probable formula

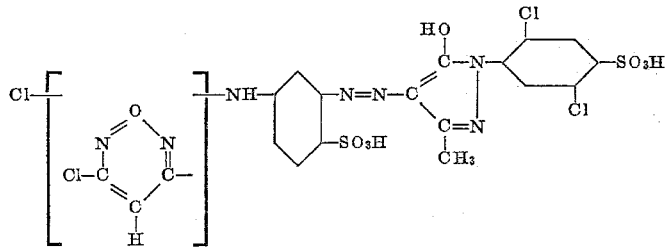

the red dyestuff of the formula

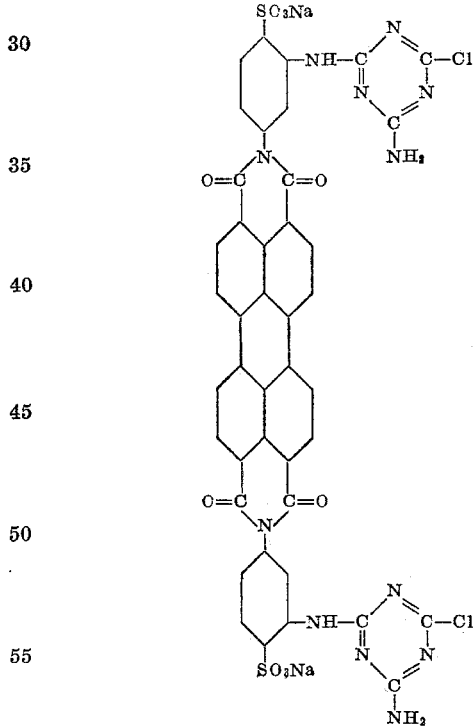

Example 9

10 parts of starch are stirred into a mixture of 30 parts of water, 20 parts of sodium chloride and 3.5 parts of the compound of the formula

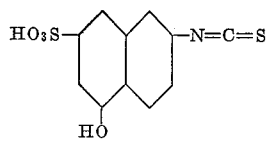

The whole is stirred for 30 minutes, treated with 8 parts of sodium hydroxide solution of 30% strength and then stirred on until it forms a paste which after 24 hours is introduced into 500 parts of water. The suspension is rendered acid to Congo red with hydrochloric acid, filtered, and the filter residue is thoroughly washed with a solution of 1 part by volume of concentrated hydrochloric acid per 100 parts by volume of water, then finely comminuted and added to 200 parts of water. The mixture is neutralized with sodium hydroxide solution and then treated for 1 hour with 200 parts of a cold solution of 4% strength of ad iazo compound which has been prepared from meta-chloraniline and stabilized with zinc chloride. The solution is then rendered acid to Congo red, filtered off and washed with water containing hydrochloric acid. The filter cake is finely disintegrated and added to alcohol; the whole is neutralized with sodium hydroxide solution, filtered, and the dyestuff derivative is rinsed alcohol, dried and ground.

A dyestuff of red color is obtained.

Example 10

10 parts of wheat starch are stirred into a mixture of 30 parts of water, 20 parts of sodium chloride and 2.7 parts of the compound of the formula

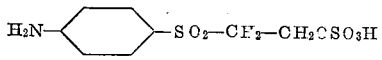

The whole is stirred for 30 minutes, then treated with 8 parts of sodium hydroxide solution of 30% strength and stirred on until it forms a paste which after 24 hours is introduced into 500 parts of water. The suspension is rendered acid to Congo red with hydrochloric acid, filtered, and the filter cake is washed with a solution containing 1 part by volumeo f concentrated hydrochloric acid per 100 parts by volume of water.

When the compound of the formula

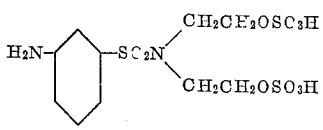

is reacted with starch as described above, an equally good effect is achieved. Subsequent diazotization and coupling as described in preceding examples yields a wide variety of dyestuffs.

Example 11

10 parts of maize starch are stirred into a mixture of 30 parts of water, 20 parts of sodium chloride and 4.7 parts of the compound of the formula

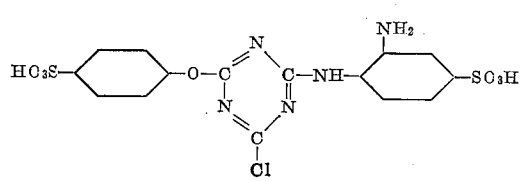

The whole is stirred for 30 minutes, then treated with 8 parts of sodium hydroxide solution of 30% and stirred on until it forms a paste which after 24 hours is introduced into 500 parts of water. The suspension is rendered acid to Congo red with hydrochloric acid, filtered, and the filter cake is washed with a solution containing 1 part by volume of concentrated hydrochloric acid per 100 parts by volume of water.

Subsequent diazotization and coupling with the coupling components shown in the table in Example 1 yield derivatives which dye the shades listed.

Example 12

10 parts of potato starch are stirred into a mixture of 30 parts of water, 20 parts of sodium chloride and 3.3 parts of the compound of the formula

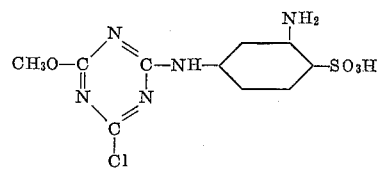

The whole is stirred for 30 minutes, then treated with 8 parts of sodium hydroxide solution of 30% strength and stirred on until it forms a paste which after 24 hours is introduced into 500 parts of water. The suspension is rendered acid to Congo red with hydrochloric acid, filtered, and the filter residue is washed with a solution of 1 part by volume of concentrated hydrochloric acid per 100 parts by volume of water.

Subsequent diazotization and coupling with the coupling components shown in the table in Example 1 yield derivatives which dye the shades listed.

Example 13

20 parts of wheat starch are stirred into a mixture of 100 parts of water, 40 parts of sodium chloride and 47.2 parts of the compound of the formula

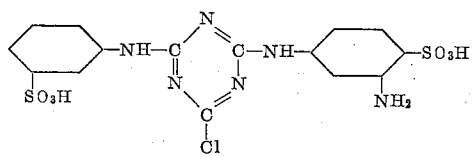

(in the form of the sodium salt)

When the mixture has been stirred for 15 minutes, 60 parts of sodium hydroxide solution of 30 percent strength are added, and the whole allowed to stand for 24 hours. The solid reaction product is dispersed in 1000 parts of water and rendered acid to Congo red with hydrochloric acid. The precipitate is filtered off, dispersed in a small amount of alcohol, neutralized with sodium hydroxide solution, and dried.

Three fourths of the resulting dry product are reacted once more as described above, and the reaction repeated once more with three fourths of the product so obtained.

The product obtained after this triple reaction is pasted with a little water, and dialyzed for 2 days The dialyzation product is evaporated and dried. The product so obtained has a substitution degree (DS) of 0.8.

By subsequent diazotization and coupling with the coupling components mentioned in the above table derivative with the indicated shades can be obtained.

When the coupling component is, for example, 1-benzolyamino-8-hydroxynaphthalene-3:6-disulfonic acid, the resulting product contains about 80% of pure azo dyestuff. When coupling components of higher molecular weight are used (as compared to the disulfonic acid just mentioned), the percentage of pure azo dyestuff is higher.

Example 14

10 parts of alkali-soluble methyl cellulose are allowed to swell for 30 minutes in a suspension of 1 part of the compound of the formula

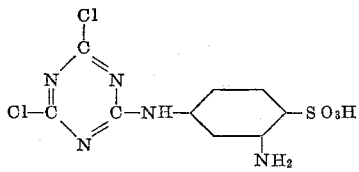

in 220 parts of water, and 160 parts of sodium hydroxide solution of 15% strength are then slowly added. The whole is stirred for 1 hour at room temperature and the reaction solution is then neutralized with 2 N-hydrochloric acid, the precipitate is filtered off and thoroughly washed.

The resulting substance is added to a solution of 5 parts of concentrated hydrochloric acid in 200 parts of water, and the mixture is diazotized with 0.2 N-sodium nitrite solution at 0 to 10° C. until a reaction on potassium iodide-starch paper appears, then filtered and the filter residue is washed cold.

The diazotized product thus obtained is then added to a solution of 4 parts of 1-(2'-chlorophenyl)-3-methyl-5-pyrazolone-5'-sulfonic acid and 5 parts of sodium acetate in 300 parts of water; after 1 hour the coupling reaction is complete. The coupling mixture is filtered and the filtered product is thoroughly washed with cold and hot water.

The resulting dark-yellow product is soluble in sodium hydroxide solution of 6 to 8% strength.

Example 15

10 parts of alkali-soluble hydroxyethyl cellulose are allowed to swell for 30 minutes in a suspension of 4.12 parts of the compound of the formula

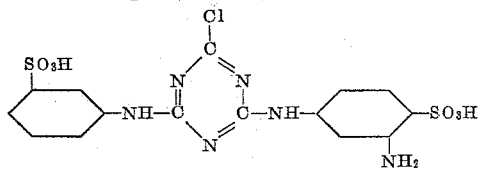

in 180 parts of water, and 220 parts of sodium hydroxide solution of 15% strength are then slowly added. The reaction mixture is stirred for 20 hours at room temperature, neutralized with hydrochloric acid, and the precipitate is filtered off and thoroughly washed.

The resulting substance is added to a solution of 5 parts of concentrated hydrochloric acid in 200 parts of water, titrated with 0.2 N-sodium nitrite solution at 0 to 10° C. until a reaction on potassium iodide-starch paper appears, and the product is then filtered off and washed cold.

The diazotized product is added to a solution of 4 parts of 1-(2'-chlorophenyl)-3-methyl-5-pyrazolone-5'-sulfonic acid and 5 parts of sodium acetate in 300 parts of water; after 1 hour the product is filtered off, thoroughly washed cold and hot, and then dried.

The resulting product contains 22 parts of yellow dyestuff for every 100 parts of cellulose material and is soluble in sodium hydroxide solution of 6 to 8% strength.

Example 16

10 parts of an alkali-soluble hydroxyethyl cellulose are allowed to swell for 30 minutes in a suspension of 1 part of the dyestuff of the formula

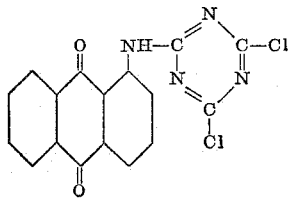

in 110 parts of water; 80 parts of sodium hydroxide solution of 15% strength and 1 part of sodium hydrosulfite are then slowly added. The reaction solution is stirred for 1 hour, poured into 2000 parts of water, and the precipitate is filtered off and washed with a solution containing per liter 2 grams of sodium carbonate and 1 gram of sodium hydrosulfite until the washings run colorless. The product is then copiously washed with water.

A product of dark yellow color is obtained which is soluble in sodium hydroxide solution of 6 to 8% strength.

Example 17

5 parts of an alkali-soluble hydroxyethyl cellulose are allowed to swell for 30 minutes in a suspension of 1 part of the compound of the formula

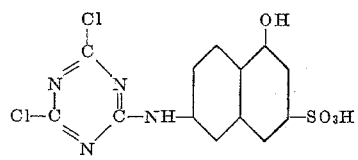

in 110 parts of water, and 80 parts of sodium hydroxide solution of 15% strength are then slowly added. The reaction solution is stirred for 1 hour at room temperature, neutralized with 2 N-hydrochloric acid, filtered, and the filter cake is thoroughly washed.

The resulting substance is treated for 1 hour in 200 parts of a cold solution of 3% strength of a diazo compound of meta-chloraniline which has been stabilized with zinc chloride, filtered, and the filter cake is washed cold and hot and then dried.

A dark-red substance is obtained which is soluble in sodium hydroxide solution of 6 to 8% strength.

Example 18

10 parts of an alkali-soluble hydroxyethyl cellulose are allowed to swell for 30 minutes in a solution of 1 part of the dyestuff of the formula

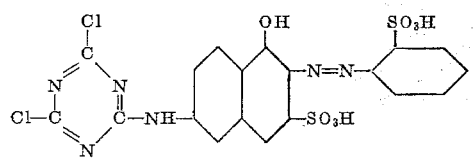

in 110 parts of water, and 80 parts of sodium hydroxide solution of 15% strength are then slowly added. The reaction solution is stirred for 1 hour at room temperature, then neutralized with hydrochloric acid, and the precipitate is filtered off, thoroughly washed cold and hot, and then dried.

The resulting dark-orange colored substance is soluble in sodium hydroxide solution of 6 to 8% strength.

When the above reaction is performed with the dyestuff of the formula

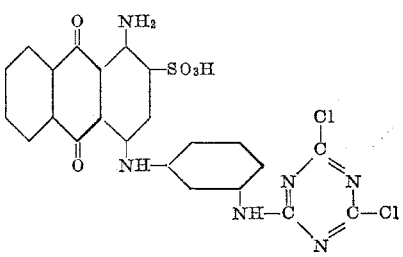

a dark-blue preparation is obtained.

Example 19

10 parts of an alkali-soluble hydroxyethyl cellulose are allowed to swell for 30 minutes in a solution of 1 part of the dyestuff of the formula

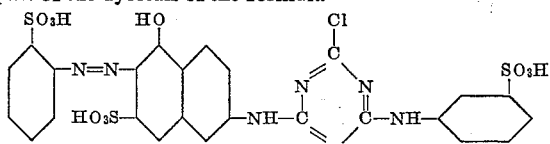

in 110 parts of water, and 80 parts of sodium hydroxide solution of 15% strength are then slowly added. The reaction solution is stirred for 12 hours at room temperature, neutralized with hydrochloric acid, and the precipitate is filtered off, thoroughly washed cold and hot, and then dried.

A dark-orange colored substance is obtained.

When the above reaction is performed with the dyestuff of the formula

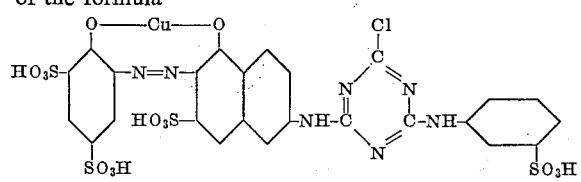

a preparation of dark-ruby color is obtained.

A blue preparation is obtained when the sulfuric acid monoester of the β-hydroxyethyl-monoamide of copper phthalocyanine-3:4':4'':4'''-tetrasulfonic acid is used.

A blue preparation is obtained by performing the reaction with the dyestuff of the formula

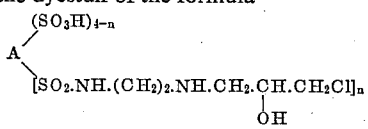

obtainable from copper phthalocyanine-3:4':4'':4'''-tetrasulfonic acid, in which formula A represents the residue of copper phthalocyanine, and $n=1$ or 2.

The products mentioned above are soluble in sodium hydroxide solution of 6 to 8% strength.

Similar products are obtained by using the appropriate monoamides or diamides of copper phthalocyanine-3:3':3'':3'''-tetrasulfonic acid.

A red preparation is obtained when the reaction is performed with the dyestuff of the formula

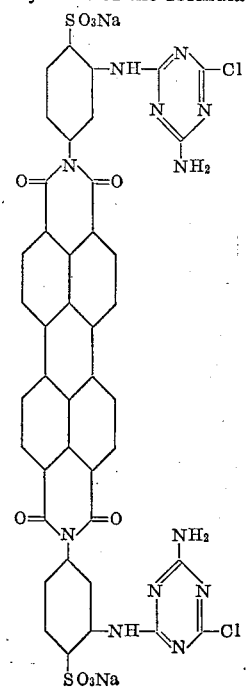

Example 20

4.72 parts of the compound of the formula

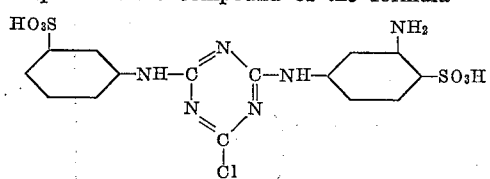

are pasted with 60 parts of water and mixed with 10 parts of alkali-soluble methyl cellulose. The mixture is allowed to swell for 1 hour and then intimately mixed with 50 parts of sodium chloride and 15 parts of sodium hydroxide solution of 15% strength. The whole is left to itself for 20 hours, and the reaction product is then comminuted, introduced into 1000 parts of water, neutralized with 2 N-hydrochloric acid, and 200 parts of saturated sodium chloride solution are added. The precipitated cellulose material is filtered off and thoroughly washed with sodium chloride solution of 5 to 10% strength.

The resulting filter cake is finely disintegrated and added to a solution of 3 parts of concentrated hydrochloric acid in 200 parts of sodium chloride solution of 10% strength, and the mixture is treated at 0 to 10° C. with 2 N-sodium nitrite solution until a reaction on potassium iodide-starch paper is obtained, then adjusted with sodium bicarbonate to pH=7 to 8, and a solution of 3 parts of 1-benzoylamino-8-hydroxynaphthalene-3:6-disulfonic acid and 10 parts of sodium bicarbonate in 200 parts of water is added. After 5 hours the mixture is filtered, washed colorless with sodium chloride solution of 5 to 10% strength, and the product is dried. A red dyestuff is obtained.

When, instead of 1-benzoylamino-8-hydroxynaphthalene-3:6-disulfonic acid, other coupling components are used, other dyestuffs are obtained such, for example, as:

| | Coupling Component | Tint |
|---|---|---|
| 1 | HO₃S—[naphthalene]—NH—CO—CH₃ with HO | Orange. |
| 2 | [naphthalene with OH and SO₃H] | Red orange. |
| 3 | HO₃S—[naphthalene with OH]—SO₃H | Do. |
| 4 | HO₃S—[naphthalene with HO, NH₂, SO₃H]—N=N—[phenyl-SO₃H] | Dark blue. |
| 5 | H₃C—C=C—OH pyrazolone with —[phenyl-SO₃H, Cl] | Yellow (+). |

| Coupling Component | Tint |
|---|---|
| 6...... 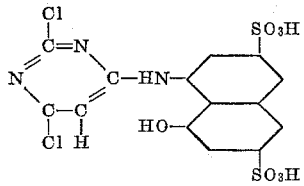 | Yellow. |
| 7...... (2/3) and (1/3) 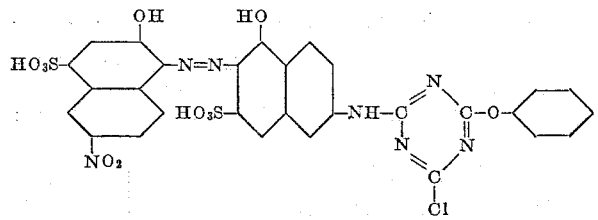 | Green. |

The product marked (+) is soluble in sodium hydroxide solution of 6 to 8% strength. The other dyestuffs mentioned above can usually be converted into an amorphous form, which is soluble in water and aqueous alkalies, by wet-grinding in alcohol.

Example 21

5 parts of the 1:2-chromium complex containing two molecules of the dyestuff of the formula

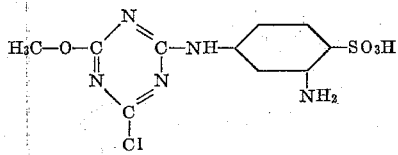

bound in complex union to one atom of chromium, are suspended in 60 parts of water, and 10 parts of alkali-soluble methyl cellulose are added. The whole is allowed to swell for 1 hour, and the swelled substance is then intimately mixed with 20 parts of sodium chloride and 15 parts of sodium hydroxide solution of 15% strength. After a reaction period of 20 hours the solid mass is disintegrated, suspended in a mixer in 50 parts of water, neutralized with 2-N-hydrochloric acid, and 150 parts of saturated sodium chloride solution are added. The precipitate is filtered off and thoroughly washed with sodium chloride solution of 5 to 10% strength.

A greyish black substance is obtained.

Example 22

3.3 parts of the compound of the formula are suspended in 50 parts of water, and 10 parts of alkali-soluble methyl cellulose are added. The whole is allowed to swell for 1 hour, and the swelled substance is intimately mixed with 20 parts of sodium chloride and 15 parts of sodium hydroxide solution of 15% strength. After a reaction period of 20 hours the solid mass is disintegrated, suspended in a mixer in 50 parts of water, neutralized with 2-N-hydrochloric acid, and mixed with 150 parts of saturated sodium chloride solution. The precipitate is filtered off and thoroughly washed with sodium chloride solution of 5 to 10% strength.

The resulting filter cake is finely distributed and added to a solution of 3 parts of concentrated hydrochloric acid in 200 parts of sodium chloride solution of 10% strength, and then treated at 0 to 10° C. with 2 N-sodium nitrite solution until a reaction on potassium iodide-starch paper appears; the whole is then adjusted with sodium bicarbonate to pH=7 to 8, and a solution of 1.3 parts of 1-benzoylamino-8-hydroxynaphthalene-3:6-disulfonic acid and 5 parts of sodium bicarbonate in 200 parts of water is added, after 5 hours filtered, washed colorless with sodium chloride solution of 5 to 10% strength, and the product is dried. A substance of red color is obtained.

Example 23

4.67 parts of the compound of the probable formula (obtained by condensing 2:4:6-trichloropyrimidine with 1-amino-8-hydroxynaphthalene-3:6-disulfonic acid) are dissolved in 60 parts of water, and 10 parts of alkali-soluble methyl cellulose are added. The whole is allowed to swell for 1 hour, and the swelled mass is then thoroughly mixed with 20 parts of sodium chloride and 15 parts of sodium hydroxide solution of 15% strength. After a reaction period of 20 hours the solid mass is disintegrated, suspended in a mixer in 500 parts of water, neutralized with 2 N-hydrochloric acid, and 150 parts of saturated sodium chloride solution are added. The precipitated reaction product is filtered off and thoroughly washed with sodium chloride solution of 5 to 10% strength.

The resulting substance is treated for 4 hours in a cold solution of 10 parts of the diazo compound of meta-chloraniline stabilized with zinc chloride in 400 parts of water. 100 parts of saturated sodium chloride solution are then added, and the precipitate is filtered off and thoroughly washed with sodium chloride solution of 5 to 10% strength.

A dark-red substance is obtained.

A dark-red substance is likewise obtained when the compound of the above formula is replaced by the corresponding trichloropyrimidine compound.

Example 24

5 parts of the dyestuff of the probable formula

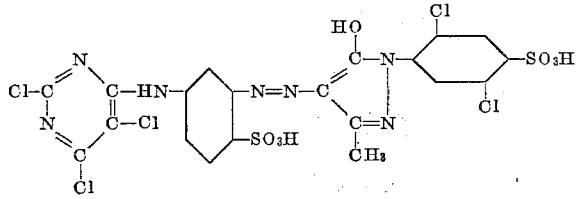

(obtained by condensing 2:4:5:6-tetrachloropyrimidine with the amino-azo-pyrazolone dyestuff) are suspended in 60 parts of water, and 10 parts of alkali-soluble methyl cellulose are added. The whole is allowed to swell for 1 hour, and the swelled mass is intimately mixed with 20 parts of sodium chloride and 15 parts of sodium hydroxide solution of 15% strength. After a reaction period of 20 hours the solid substance is disintegrated, suspended in a mixer in 500 parts of water, neutralized with 2 N-hydrochloric acid, and 150 parts of saturated sodium chloride solution are added. The precipitated reaction product is filtered off and thoroughly washed with sodium chloride solution of 5 to 10% strength.

A substance of yellow color is obtained.

Example 25

5 parts of the dyestuff of the formula

[Structure: naphthalene azo compound with SO$_3$H, OH, NH-CO-CH$_2$CH$_2$-Cl, HO$_3$S, NH-CO-CH$_2$CH$_2$-Cl substituents]

are suspended in 60 parts of water, 20 parts of alkali-soluble methyl cellulose are added. The mixture is allowed to swell for 1 hour and then intimately mixed with 20 parts of sodium chloride and 15 parts of sodium hydroxide solution of 15% strength. After a reaction period of 20 hours the solid substance is disintegrated, suspended in a mixer in 500 parts of water, neutralized with 2 N-hydrochloric acid, and 150 parts of saturated sodium chloride solution are added. The precipitate is filtered off and thoroughly washed with sodium chloride solution of 5 to 10% strength.

A substance of dark-orange color results.

A dark-orange substance is likewise obtained when the compound of the above formula is replaced by the corresponding acrylamino compound.

Example 26

5 parts of the dyestuff of the formula

[Structure: azo compound with OCH$_3$, SO$_3$H, SO$_3$H, NH$_2$, SO$_2$-NH-CH$_2$CH$_2$-Cl substituents]

are suspended in 60 parts of water, and 20 parts of alkali-soluble methyl cellulose are added. The whole is allowed to swell for 1 hour and then intimately mixed with 20 parts of sodium chloride and 15 parts of sodium hydroxide solution of 15% strength. After a reaction period of 20 hours the solid substance is disintegrated, suspended in a mixer in 500 parts of water, neutralized with 2 N-hydrochloric acid, and 150 parts of saturated sodium chloride solution are added. The precipitate is filtered off and thoroughly washed with sodium chloride solution of 5 to 10% strength.

A substance of reddish yellow color is obtained.

Example 27

5 parts of the dyestuff of the formula

[Structure: anthraquinone-type compound with NH$_2$, CO, SO$_3$H, SO$_2$-CH$_2$CH$_2$OSO$_3$H, CO, NH-phenyl substituents]

are suspended in 60 parts of water, and 20 parts of alkali-soluble methyl cellulose are added. The whole is allowed to swell for 1 hour and then intimately mixed with 20 parts of sodium chloride and 15 parts of sodium hydroxide solution of 15% strength. After a reaction period of 20 hours the solid substance is disintegrated, suspended in a mixer in 500 parts of water, neutralized with 2 N-hydrochloric acid, and 150 parts of saturated sodium chloride solution are added. The precipitate is filtered off and thoroughly washed with sodium chloride solution of 5 to 10% strength.

A substance of dark-blue color results.

Example 28

2.7 parts of the compound of the formula $$H_2N-\langle\phantom{-}\rangle-SO_2-CH_2CH_2-O-SO_3H$$

are suspended in 60 parts of water, and 10 parts of alkali-soluble methyl cellulose are added. The whole is allowed to swell for 1 hour and then intimately mixed with 20 parts of sodium chloride and 15 parts of sodium hydroxide solution of 15% strength. After a reaction period of 20 hours the solid substance is disintegrated, suspended in a mixer in 500 parts of water, neutralized with 2 N-hydrochloric acid, and 150 parts of saturated sodium chloride solution are added. The precipitate is filtered off and thoroughly washed with sodium chloride solution of 5 to 10% strength.

The resulting filter cake is finely dispersed and added to a solution of 3 parts of concentrated hydrochloric acid in 200 parts of sodium chloride solution of 10% strength, and then treated at 0 to 10° C. with 0.2 N-sodium nitrite solution until a permanent coloration on potassium iodide-starch paper is obtained, the mixture is then adjusted with sodium bicarbonate to pH=7 to 8, and a solution of 1.8 parts of 1-hydroxynaphthalene-4-sulfonic acid and 7 parts of sodium bicarbonate in 200 parts of water is added. After 5 hours the mixture is filtered, washed colorless with sodium chloride solution of 5 to 10% strength, and the product is dried. A substance of dark-red color is obtained.

Example 29

5 parts of the dyestuff of the formula

[Structure: naphthalene azo compound with NH$_2$, OH, HO$_3$S, SO$_3$H, NH-COO-phenyl substituents]

are suspended in 60 parts of water, and 10 parts of alkali-soluble methyl cellulose are added. The whole is allowed to swell overnight and then mixed with 20 parts of sodium chloride. 15 parts of sodium hydroxide solution of 15% strength are slowly added within 3 hours and intimately mixed with the reaction mass. After another 2 hours the mass is disintegrated, suspended in a mixer in 500 parts of water, neutralized with 2 N-hydrochloric acid, and 150 parts of saturated sodium chloride solution are added. The precipitate is filtered off and thoroughly washed with sodium chloride solution of 5 to 10% strength. A substance of dark-red color is obtained.

When 5 parts of the dyestuff of the formula

[Structure: pyrazole-azo compound with H$_3$C-C, C-N=N-, N, N, SO$_3$H, NH-COO-phenyl, dichlorophenyl-SO$_3$H substituents]

are subjected to the reaction described above, a substance of dark-yellow color results.

Example 30

5 parts of the dyestuff of the formula

[Structure: naphthalene azo compound with SO$_3$H, HO, HO$_3$S, N-[CH$_2$-CH(OH)-CH$_2$Cl]$_2$ substituents]

are suspended in 60 parts of water, and 10 parts of alkali-soluble methyl cellulose are added. The whole is allowed to swell for 1 hour and then intimately mixed with 20 parts of sodium chloride and 15 parts of sodium hydroxide solution of 15% strength. After a reaction period of 20 hours the solid mass is disintegrated, suspended in a mixer in 500 parts of water, neutralized with 2 N-hydrochloric acid, and 150 parts of saturated sodium chloride solution. The precipitate is filtered off and thoroughly washed with sodium chloride solution of 5 to 10% strength.

A substance of reddish brown color is obtained.

Example 31

5 parts of the dyestuff of the formula

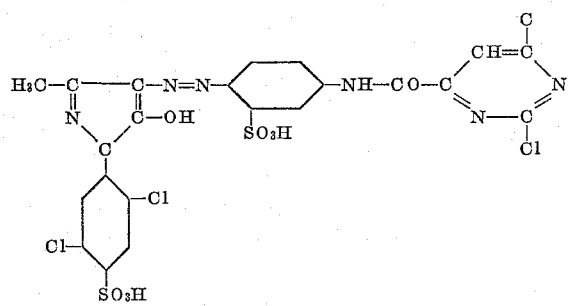

are suspended in 60 parts of water, and 10 parts of alkali-soluble methyl cellulose are added. The whole is allowed to swell for 1 hour and then intimately mixed with 20 parts of sodium chloride and 15 parts of sodium hydroxide solution of 15% strength. After a reaction period of 20 hours the solid mass is disintegrated, suspended in a mixer in 500 parts of water, neutralized with 2 N-hydrochloric acid, and 150 parts of saturated sodium chloride solution are added. The precipitate is filtered off and thoroughly washed with sodium chloride solution of 5 to 10% strength.

A substance of dark yellow color is obtained.

Example 32

20 parts of water-soluble carboxymethyl cellulose of low viscosity (trademark Renose SF) are dissolved in 60 parts of water. 4.72 parts of the compound of the formula

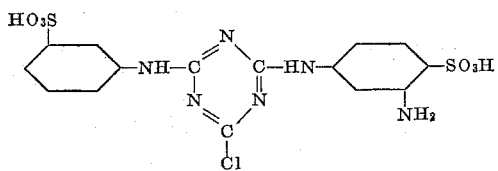

are then kneaded into the resulting viscous mass which is then mixed with 15 parts of sodium hydroxide solution of 15% strength. After 22 hours the reaction mixture is worked up as follows:

The tough reaction mass is disintegrated, mixed with 250 parts of water and worked in a high-speed stirrer to produce a homogeneous mass. While stirring the whole rapidly, the cellulose mass is precipitated with 80 parts of 2 N-hydrochloric acid and filtered off. The filter cake is thoroughly washed wtih a solution containing 1 part by volume of concentrated hydrochloric acid per 100 parts by volume of water. The filter cake is then disintegrated, mixed with 100 parts of water and 20 parts of 2 N-hydrochloric acid, nad diazotized at 0 to 10° C. with 0.2 N-sodium nitrite solution until a reaction on potassium iodide-starch paper is obtained. The reaction mixture is then neutralized with solid sodium bicarbonate and a solution of 2.5 parts of 1-benzoylamino-8-hydroxy-naphthalene-3:6-disulfonic acid and 5 parts of sodium bicarbonate in 150 parts of water is added. After 3 to 4 hours the coupling is complete. The resulting cellulose+dyestuff compound is precipitated with 100 parts of 2 N-hydrochloric acid, filtered off and washed with water of an acid reaction to Congo paper. The filter cake is dissolved in 200 cc. of alcohol of 80% strength, and the solution is neutralized with sodium hydroxide solution of 15% strength, whereupon the cellulose+dyestuff compound separates out and is filtered off and rinsed with alcohol on the filter.

A water-soluble substance of intensely red color is obtained.

Example 33

22 parts of a viscous, water-soluble carboxymethyl cellulose (trademark Renose V extra) are added to 60 parts of water; 4.72 parts of the compound of the formula

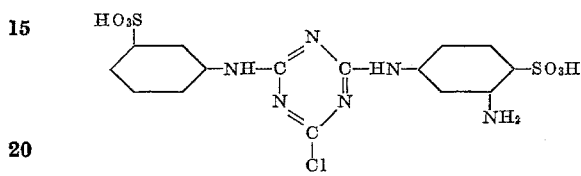

are then kneaded into the viscous mass, which is then intimately mixed with 15 parts of sodium hydroxide solution of 15% strength. After 22 hours the whole is worked up as follows:

The tough reaction product is disintegrated, mixed with 500 parts of water, and worked in a high-speed stirrer until a homogeneous mass has been obtained. While stirring the whole rapidly, the cellulose mass is mixed with 90 parts of 2 N-hydrochloric acid, and the reaction mixture is filtered. The filter cake is thoroughly washed with a solution containing 1 part by volume of concentrated hydrochloric acid per 100 parts by volume of water, then disintegrated, mixed with 200 parts of water and 20 parts of 2 N-hydrochloric acid, and diazotized at 0 to 10° C. with 0.2 N-sodium nitrite solution until a reaction on potassium iodide-starch paper is obtained. The reaction mass is then neutralized with solid sodium bicarbonate and 1.7 parts of 2-acetylamino-5-hydroxynaphthalene-7-sulfonic acid in 200 parts of water is added. After 3 to 4 hours the coupling is complete. The cellulose+dyestuff compound formed is precipitated with 100 parts of 2 N-hydrochloric acid, filtered off and washed with water having an acid reaction to Congo paper. The filter cake is disintegrated, suspended in 200 cc. of alcohol of 80% strength, and the cellulose mass is neutralized with sodium hydroxide solution of 15% strength. The resulting product is filtered off, rinsed with alcohol on the filter and dried.

A water-soluble, highly viscous substance of deep orange color results.

Example 34

4.72 parts of the compound of the formula

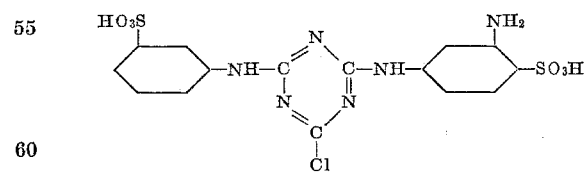

are pasted with 60 parts of water, and the paste is kneaded with 20 parts of carboxymethyl cellulose. The mixture is intimately mixed after 2 hours with 10 parts of sodium chloride and 14 parts of sodium hydroxide solution of 15% strength. After a reaction period of 20 hours the whole is worked up as follows:

The tough mass is disintegrated, mixed with 250 parts of water and worked in a high-speed stirrer to form a homogeneous mass. While stirring rapidly, the cellulose mass is precipitated with 80 parts of 2 N-hydrochloric acid and filtered off. The filter cake is thoroughly washed with a solution containing 1 part by volume of concentrated hydrochloric acid per 100 parts by volume of water, then disintegrated and added to 200 parts of alcohol.

This mixture is neutralized with sodium hydroxide solution of 15% strength, filtered, and the filter residue is rinsed on the filter with alcohol and dried.

5 parts of the resulting product are stirred in a high-speed stirrer into a solution of 6 parts of sodium bicarbonate in 100 parts of water. 1.5 parts of powdered copper phthalocyanine-3:3':3":3'''-tetrasulfonyl chloride are incorporated with the viscous mass. After 4 days 5 parts by volume of sodium hydroxide solution of 15% strength are stirred in.

After 1 hour the mass is introduced into 500 parts of water and precipitated with 80 parts by volume of 2 N-hydrochloric acid. The precipitate is then filtered off and thoroughly rinsed with a solution of 1 part by volume of concentrated hydrochloric acid per 100 parts by volume of water. The filter cake is disintegrated and added to 100 parts by volume of alcohol. The mixture is neutralized with sodium hydroxide solution, filtered, and the filter residue is dried.

A water-soluble product of dark-blue color results.

*Example 35*

4 parts of 2-chloro-4-(β-aminoethyl)-amino-6-(2':5'-disulfonyl)-amino-1:3:5-triazine are pasted with 50 parts of water, and 20 parts of carboxymethyl cellulose are then worked in. After 2 hours the mass is intimately mixed with 10 parts of sodium chloride and 14 parts of sodium hydroxide solution of 15% strength. After 22 hours the tough mass is disintegrated, added to 250 parts of water, converted in a high-speed stirrer into a homogeneous, viscous solution, and 80 parts by volume of 2 N-hydrochloric acid are then added. The precipitate is filtered off and thoroughly washed with a solution containing 1 part by volume of concentrated hydrochloric acid per 100 parts by volume of water. The filter cake is disintegrated, added to 200 parts of alcohol, and the mixture is neutralized with sodium hydroxide solution of 15% strength and then filtered, the filter residue being rinsed with alcohol.

4 parts of the resulting product are stirred in a high-speed stirrer into 100 parts of water and 1 part of concentrated ammonia. After 30 minutes, 1 part of powdered copper phthalocyanine-3:3':3":3''' - tetrasulfonyl chloride is added, and the mixture is allowed to react while being gently stirred for 24 hours at 25 to 30° C. After a reaction time of 6 hours 1 part of concentrated ammonia is added, and after 24 hours the whole is worked up as described in the last paragraph of Example 34.

A water-soluble substance of dark-blue color results.

*Example 36*

300 parts off aspen cellulose are disintegrated in water in a high-speed stirrer and suction-filtered until the material shows an increase in weight of 200%. The cellulose is then treated for 1 hour at 40° C. in a Pfleiderer kneader with 250 parts of caustic soda, 11 parts by volume of hydrogen peroxide of 27% by volume strength are then added, and the whole is treated for another 3 hours at 40° C., then cooled to 25° C., and 210 parts of monochloracetic acid and 13 parts of caustic soda are added. The mixture is treated for another 4 hours at 45 to 50° C., and then left to itself overnight.

One thirtieth of the resulting mass of carboxymethyl cellulose is mixed with 20 parts of sodium chloride and 50 parts of water, and 2 parts of sodium bicarbonate are then slowly stirred in. The mixture is left to itself for 10 minutes, whereupon 4.72 parts of the compound of the formula

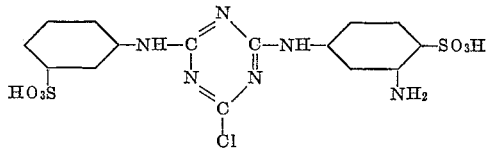

are kneaded in. After a reaction period of 24 hours the mass is mixed with 250 parts of water and disintegrated in a mixer. The reacted cellulose material is precipitated from the resulting product with 80 parts by volume of 2 N-hydrochloric acid, filtered off and thoroughly washed with a solution containing 1 part by volume of concentrated hydrochloric acid per 100 parts by volume of water. The filter cake is disintegrated, mixed with 100 parts of water and 20 parts of 2 N-hydrochloric acid and diazotized at 0 to 10° C. with 0.2 N-sodium nitrite solution until a reaction on potassium iodide-starch paper is obtained. The reaction mixture is then neutralized with solid sodium bicarbonate, and a solution of 2 parts of 1-benzoylamino - 8-hydroxynaphthalene-3:6-disulfonic acid and 4 parts of sodium bicarbonate in 80 parts of water is added. After 3 to 4 hours the coupling is complete. The resulting cellulose+dyestuff compound is precipitated with 4 times its own volume of alcohol, filtered off, thoroughly washed with alcohol, and dried.

The deep red substance obtained in this manner is practically completely soluble in water.

*Example 37*

10 parts of a commercial polyvinyl alcohol (trademark "Lonza," type K 44/2), 50 parts of water, 15 parts of sodium hydroxide solution of 15% strength and 20 parts of sodium chloride are intimately mixed in a mixer, and 4.72 parts of the compound of the formula

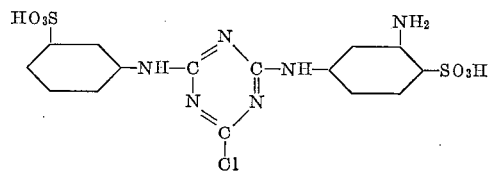

are then kneaded in the mixer. The resulting reaction mixture is kept for 24 hours in a closed vessel, then added to 500 parts by volume of sodium chloride solution of 15% strength, neutralized with 2 N-hydrochloric acid and filtered; the filter cake is thoroughly washed with sodium chloride solution of 15% strength.

The filter cake is then added to 100 parts of sodium chloride solution of 15% strength, 5 parts of concentrated hydrochloric acid are added, and the whole is diazotized at 0 to 10° C. with 2 N-sodium nitrite solution until a reaction on potassium iodide-starch paper is obtained. The reaction mixture is then adjusted with sodium carbonate to pH=6 to 7, and a solution of 1 part of 1-(2'-chlorophenyl)-3-methyl-5-pyrazolone-4'-sulfonic acid and 5 parts of sodium acetate in 100 parts of water is added. The mixture is treated for 4 hours, filtered, thoroughly washed with sodium chloride solution of 15% strength, and the filter residue is thoroughly rinsed with alcohol of 70% strength and then dried.

The resulting yellow mass is soluble in water except for a very small residue.

*Example 38*

10 parts of soluble starch are mixed with 40 parts of water, 15 parts of the dyestuff of the formula

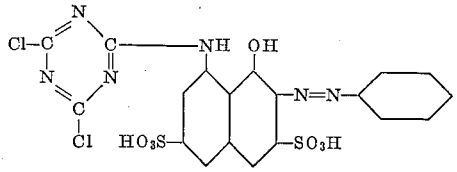

and 15 parts of sodium hydroxide solution of 15% strength. After 4 hours the solid mass is disintegrated, suspended in a mixer in 500 parts of water, and neutralized with 2 N-hydrochloric acid. The reaction product is filtered and thoroughly washed. A red, insoluble substance is obtained.

When 15 parts of the dyestuff of the formula

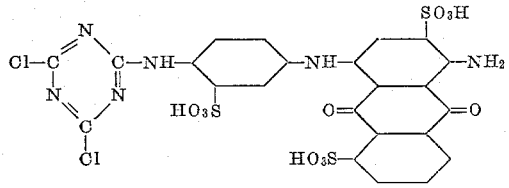

are used, a blue, insoluble substance is obtained.

When 15 parts of the dyestuff of the formula

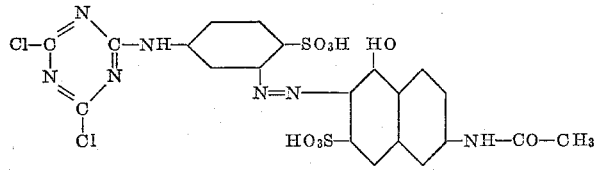

are used, an insoluble mass of orange color is obtained.

*Example 39*

10 parts of water-soluble hydroxyethyl cellulose (trademark Natrosol 250 low) are dissolved in 40 parts of water, and 10 parts of the compound of the formula

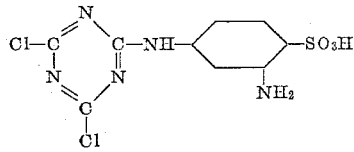

and 15 parts of sodium hydroxide solution of 15% strength are stirred into the solution. After 3 hours the hard mass is disintegrated, suspended in a mixer in 500 parts of water, and adjusted to pH=7 with 2 N-hydrochloric acid. The reaction mass is filtered off and thoroughly washed.

The filter cake is finely dispersed and added to a solution of 10 parts of concentrated hydrochloric acid in 200 parts of water, and treated at 0 to 10° with 2 N-sodium nitrite solution until a reaction on potassium iodide-starch paper is obtained. The whole is then adjusted with sodium bicarbonate to pH=7, and a solution of 9 parts of 1-benzoylamino-8-hydroxynaphthalene-3:6-disulfonic acid and 15 parts of sodium bicarbonate in 200 parts of water is added. After 5 hours the mixture is filtered, and the filter residue is thoroughly washed and dried. A red, insoluble dyestuff mass is obtained.

When other coupling components are used, other tints can be produced (see Example 20).

By the method described above, 10 parts of water-soluble starch can be reacted with a similarly good effect.

The resulting dyestuff preparations are insoluble. By grinding them in the wet state in an aqueous or alcoholic suspension (for example in a ball mill, swing mill or the like) to a particle size of about 5 microns or less, products are obtained that are very suitable, for example, for dyeing viscose in the mass.

*Example 40*

10 parts of the compound of the formula

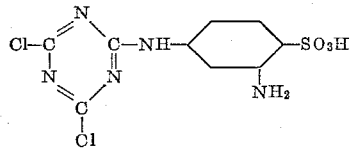

are dispersed in 50 parts of water, and 10 parts of alkali-soluble methyl cellulose are kneaded in. The whole is allowed to swell for 1 hour, and then mixed with 15 parts of sodium hydroxide solution of 15% strength. After 3 hours, the mass is dispersed in 500 parts of water in a mixer, neutralized with 2 N-hydrochloric acid, filtered, and thoroughly washed with water.

Different dyestuffs can be prepared by subsequent diazotization and coupling as described in the preceding examples. The resulting products are insoluble. After having been ground, for example, in the wet state to a particle size of 5 microns or less, they can be used for spin-dyeing viscose.

*Example 41*

10 parts of the compound of the formula

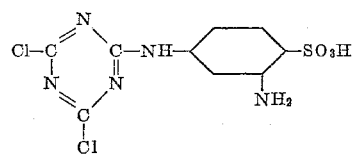

are dispersed in a high-speed stirrer in 60 parts of water, and 10 parts of water-soluble methyl cellulose are then added. The whole is allowed to swell for 5 hours, and 15 parts of sodium hydroxide solution of 15% strength are then kneaded in. After 3 hours the solid mass is dispersed in a mixer in 500 parts of water, the whole is rendered acid to Congo red with 2 N-hydrochloric acid, filtered, and thoroughly washed with a solution containing 1 part by volume of concentrated hydrochloric acid for every 100 parts by volume of water. The mass is disintegrated, treated with 200 parts of water and 20 parts of 2 N-hydrochloric acid and then diazotized at 0 to 10° C. with 0.2 N-sodium nitrite solution until a reaction on potassium iodide-starch paper is obtained. The reaction mixture is neutralized with solid sodium bicarbonate, and a solution of 10 parts of sodium bicarbonate and 6.5 parts of 1-benzoylamino-8-hydroxynaphthalene-3:6-disulfonic acid in 200 parts of water is added. After 3 to 4 hours the coupling is complete. The resulting dyestuff is precipitated with 2 N-hydrochlorice acid (which is added until an acid reaction to Congo red is achieved), filtered, and the filter residue is washed with water having an acid reaction to Congo red. The filter cake is disintegrated, suspended in 200 parts of alcohol, and neutralized with sodium hydroxide solution of 15% strength. The resulting product is filtered off, rinsed with alcohol on the filter, and dried.

Instead of 10 parts of water-soluble methyl cellulose an equal amount of water-soluble starch-sodium glycolate may be used, whereby a polyhydroxylated, red dyestuff is likewise obtained.

*Example 42*

10 parts of dextrin are dissolved in 40 parts of water in a high-speed stirrer. 10 parts of the compound of the formula

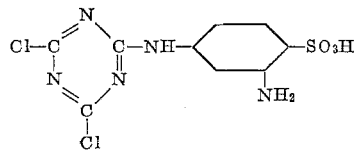

and then 15 parts of sodium hydroxide solution of 15% strength are stirred in. After 3 hours, the resulting solid mass is dispersed in 500 parts of water in a mixer, neutralized with 2 N-hydrochloric acid, filtered, and the filter residue is thoroughly washed.

Subsequent diozotization and coupling as described in the preceding examples yields a variety of dyestuffs; they are insoluble in water and can be used for spin-dyeing viscose, for example after having been wet-ground to a particle size of 5 microns or less.

Example 43

10 parts of the compound of the formula

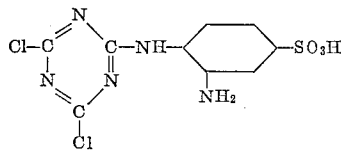

are dispersed in 60 parts of water in a high-speed stirrer. 10 parts of finely powdered, purified sodium alginate are then added. The whole is allowed to swell overnight, and 15 parts of sodium hydroxide solution of 15% strength are worked into the mass. After 3 hours, the resulting solid mass is dispersed in 500 parts of water in a mixer, rendered acid to Congo red with 2 N-hydrochloric acid, filtered, and the residue is thoroughly washed with a solution containing 1 part by volume of concentrated hydrochloric acid per 100 parts by volume of water. The remaining working up steps to yield the finished dyestuff preparation have been described in Example 39.

10 parts of the sodium salt of pectin can be converted into dyestuffs in a similar manner.

Example 44

10 parts of the compound of the formula

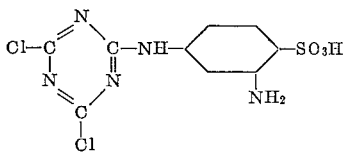

are dispersed in a mixture of 60 parts of water and 15 parts of sodium hydroxide solution of 15% strength, 10 parts of guaran (i.e. the water-soluble constituent of the so-called guar gum, a polysaccharide consisting of mannose chains and galactose chains) are then immediately kneaded in. After 3 hours, the mass is disintegrated, suspended in 500 parts of water and rendered acid to Congo red with 2 N-hydrochloric acid. The precipitate is filtered off and thoroughly washed with water having an acid reaction to Congo red. The filter cake is finely dispersed and added to 200 parts of water, diazotized and, as described in the preceding examples, coupled with 1-benzoylamino-8-hydroxynaphthalene - 3:6 - disulfonic acid, or with 2-amino-5-hydroxynaphthalene-7-sulfonic acid, or with 1-phenyl-3-methyl-5-pyrazolone-4'-sulfonic acid.

In the same manner 10 parts of gum arabic can be treated to yield dyestuffs that are likewise suitable for dyeing, for example for spin-dyeing viscose.

Example 45

5 parts of the dyestuff of the formula

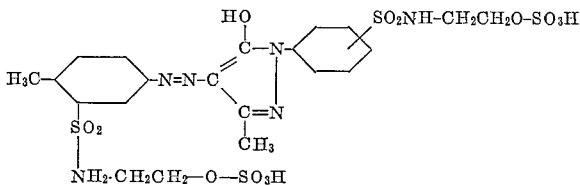

are suspended in 60 parts of water, and 10 parts of alkali-soluble methyl cellulose are added. The whole is allowed to swell for 1 hour and then intimately mixed with 20 parts of sodium chloride and 15 parts of sodium hydroxide solution of 15% strength. After a reaction period of 24 hours the solid mass is disintegrated, suspended in 500 parts of water, neutralized with 2 N-hydrochloric acid, and 150 parts of saturated sodium chloride solution are added. The precipitate is filtered off and thoroughly washed with sodium chloride solution of 5 to 10% strength.

A yellow substance is obtained.

Example 46

10 parts of the compound of the formula

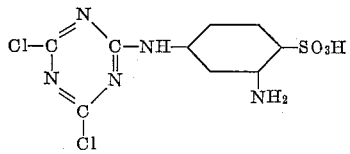

are dissolved in a mixture of 60 parts of water and 15 parts of sodium hydroxide solution of 15% strength. 10 parts of water-soluble phosphono-methylated cotton (prepared as described in Text. Res. J. 29, page 274, [1959]) are then immediately worked in. After 3 hours, the mass is disintegrated, suspended in 500 parts of water, and neutralized with 2 N-hydrochloric acid, treated with 500 parts of alcohol, filtered, and the filter residue is throughly washed with alcohol of 50% strength.

The filter cake is finely dispersed and added to 200 parts of water, and then subjected to diazotization and coupling as described in the preceding examples. On completion of the coupling reaction, 300 parts of alcohol are added, and the precipitate formed is filtered off and thoroughly rinsed on the filter with alcohol of 50% strength.

When other water-soluble phosphono-methylated celluloses, for example phosphono-methylated viscose, are treated as described above, similarly good effects are produced.

Example 47

4.72 parts of the compound of the formula

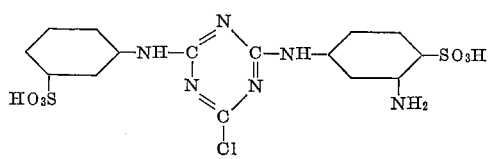

are pasted with 60 parts of water, and 10 parts of water-soluble phosphono-methylated cellulose (prepared as described in Text. Res. J. 29, page 274 [1959]), are worked in. After swelling for 1 hour, the whole is mixed with 20 parts of sodium chloride and 15 parts of sodium hydroxide solution of 15% strength. After 20 hours the mass is disintegrated, suspended in 500 parts of water and neutralized with 2 N-hydrochloric acid, treated with 500 parts of alcohol, filtered, and the filter residue is thoroughly rinsed with alcohol of 50% strength.

The further working up (diazotization and coupling) has been described in Example 46.

The above process can be applied with a similarly good yield to other water-soluble phosphono-methylated celluloses, such as phosphono-methylated viscose.

Example 48

4.72 parts of the compound of the formula

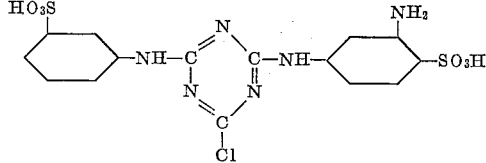

are pasted with 60 parts of water, and the paste is mixed with 10 parts of alkali-soluble methyl cellulose. The whole is allowed to swell for 1 hour and then intimately mixed with 50 parts of sodium choride and 15 parts of sodium hydroxide solution of 15% strength. The reaction product is left to itself for 20 hours, then distintegrated, added to 1000 parts of water, neutralized with 2 N-hydrochloric acid, and 200 parts of saturated sodium chloride solution are added. The precipitated cellulose product is filtered off and thoroughly washed with sodium chloride solution of 5 to 10% strength. The yield, calculated on the amount of monochlorotriazine derivative used, amounts to 60%.

The resulting filter cake is finely dispersed and added to a solution of 3 parts of concentrated hydrochloric acid in 200 parts of sodium chloride solution of 10% strength, and the mixture is treated at 0 to 10° C. with 2 N-sodium nitrite solution until a reaction on potassium iodide-starch paper is obtained, then adjusted with sodium bicarbonate to pH=7, and a solution of 3 parts of 1-benzoylamino-8-hydroxynaphthalene-3:6-disulfonic acid and 10 parts of sodium bicarbonate in 200 parts of water is added. After 5 hours, the reaction mixture is filtered, washed colorless with sodium chloride solution of 5 to 10% strength, and the filter cake is dried. A red mass is obtained.

When, instead of 1-benzoylamino-8-hydroxynaphthalene-3:6-disulfonic acid, other coupling components are used, the resulting products are of different colors.

Thus, there are obtained: with the acid of the formula

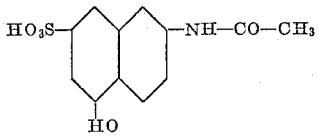

an orange-colored product; with 1-hydroxynaphthalene-4-sulfonic acid a red product; with 1:3:6-naphthol-disulfonic acid a red product; and with the acid of the formula

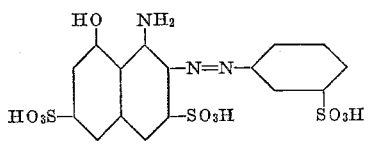

a blue product.

All above-mentioned cellulose+dyestuff derivatives are very sparingly soluble or insoluble in alkalies; however, when these products are ground in an alcoholic suspension to a particle size of 5 microns or less, as described below, and then dried, water-soluble products are obtained:

25 parts of the polyhydroxylated dyestuff, capable of swelling in water, are mixed with 250 parts of alcohol and ground in a ball mill or swing mill until the ground product is soluble in sodium hydroxide solution of 1 to 8% strength. The alcohol is then evaporated, and if desired the resulting dry dyed product is ground once more, but this time in the dry state.

*Example 49*

10 parts of dextrin are stirred into a mixture of 30 parts of water, 20 parts of sodium chloride and 3.5 parts of the compound of the formula

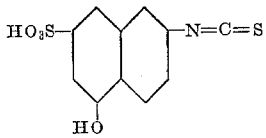

The whole is stirred for 30 minutes, treated with 8 parts of sodium hydroxide solution of 30% strength and then stirred on. After 24 hours the reaction product is introduced into 500 parts of water. The mixture is rendered acid to Congo red with hydrochloric acid and filtered. The filtration residue is finely comminuted and added to 200 parts of water. The mixture is neutralized with sodium hydroxide solution and then treated for 1 hour with 200 parts of a cold solution of 4% strength of a diazo compound which has been prepared from metachloraniline and stabilized with zinc chloride. The solution is then rendered acid to Congo red and filtered off. The filter cake is finely disintegrated and added to alcohol; the whole is neutralized with sodium hydroxide solution, filtered, and the dyestuff derivative is rinsed with alcohol, dried and ground.

A dyestuff of red color is obtained.

*Example 50*

40 parts of sodium chloride, 57 parts of the compound of the formula

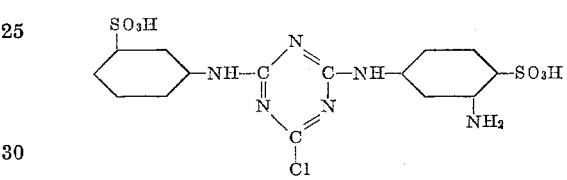

(in the form of the sodium salt)

and 60 parts of sodium hydroxide solution of 30% strength are added to a solution of 40 parts of dextrin in 150 parts of water. The mixture is stirred until a homogeneous paste is formed which is allowed to stand for 24 hours before it is dispersed in 1000 parts of water. The suspension is rendered acid to Congo red with hydrochloric acid, then filtered, and the filter cake washed with a mixture of 1 part by volume of concentrated hydrochloric acid and 100 parts of water.

The filter cake is finely distributed in 300 parts of water containing 10 parts of concentrated hydrochloric acid, then treated at 0–10° C. with 2 N-sodium nitrite solution until potassium iodide starch reaction sets in. The reaction mass is then rendered alkaline with sodium bicarbonate, and a suspension of 50 parts of 1-benzoyl-amino-8-hydroxynaphthalene-3,6-disulfonic acid and 30 parts of sodium bicarbonate in 1000 parts of water is added. After 5 hours, the suspension is neutralized with hydrochloric acid, and treated with 1500 parts of isopropyl alcohol. The red dyestuff which precipitates is filtered off, dried, and, if necessary ground.

Following the same procedure, 58 parts of the compound of the formula

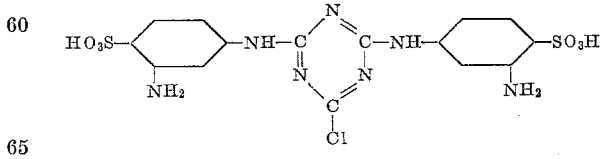

can be reacted with 40 parts of dextrin. On coupling—which has to be performed with twice the quantity of coupling component—a red dyestuff is obtained which has similar properties. When the 1-benzoylamino-8-hydroxynaphthalene-3,6-disulfonic acid is replaced by a coupling component given in the table below, there is obtained by the process described in the first two paragraphs of this example a dyestuff of the shade indicated.

| Coupling component | Shade |
|---|---|
| HO₃S—[naphthalene]—NH.CO.CH₃ with OH | Orange. |
| [naphthalene with OH and SO₃H] | Scarlet. |
| [pyrazolone structure with CH=C, N-N, C—CH₃, and phenyl-SO₃H, OH, SO₃H] | Yellow. |
| NaO₃S—[naphthalene-OH]—NH—C(triazine)—NH—[cyclohexyl-SO₃Na], Cl | Orange. |
| NaO₃S—[naphthalene OH, SO₃Na]—NH—C(triazine)—NH—[cyclohexyl], Cl | Red. |

*Example 51*

40 parts of sodium chloride, 84 parts of the compound of the formula

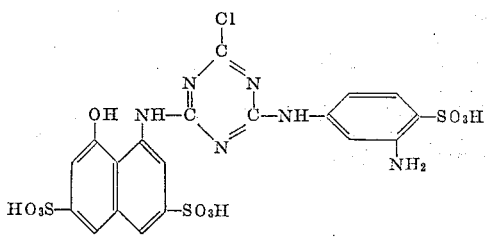

(in the form of the sodium salt)

and 60 parts of sodium hydroxide solution of 30% strength are added to a solution of 40 parts of dextrin in 150 parts of water. The mixture is stirred until a homogeneous paste is formed which is allowed to stand for 24 hours before it is dispersed in 1000 parts of water. The suspension is rendered alkaline to Congo red with hydrochloric acid, then filtered, and the filter cake washed with a mixture of 1 part by volume of concentrated hydrochloric acid and 100 parts of water.

The filter cake is introduced into a cold (0–5° C.) solution, rendered alkaline with sodium bicarbonate, of 21 parts of diazotized orthanilic acid in 200 parts of water and treated therein for 4 hours. It is then rendered acid to Congo red with hydrochloric acid. The red precipitate that forms is filtered off and washed as described above. The filter cake is dispersed in 200 parts of water containing 10 parts of concentrated hydrochloric acid and treated at 0–10° C. with 2 N-sodium nitrite solution until potassium iodide starch reaction sets in.

The reaction mass is then rendered alkaline with sodium bicarbonate, and a suspension of 50 parts of 1-benzoylamino-8-hydroxynaphthalene-3,6-disulfonic acid and 30 parts of sodium bicarbonate in 1000 parts of water is added. After 5 hours the red suspension is further treated as described in Example 50.

When in this example, orthanilic acid and 1-benzoylamino-8-hydroxynaphthalene-3,6-disulfonic acid are replaced by the diazo and coupling components shown in the table below, dyestuffs are obtained which produce the shade indicated in the third column. If desired, only the first coupling reaction may be performed, as is the case for the 1st, 4th, 8th, 12th, and 16th dyestuffs.

| Azo component | Coupling component | Shade |
|---|---|---|
| Orthanilic acid | | Red. |
| Do | 1,4-naphthol sulfonic acid | Red. |
| Do | 1-(2'-naphthyl)-3-methyl-5-pyrazolone-4',8'-disulfonic acid | Yellowish red. |
| 4-benzoylamino-2,5-dimethoxy aniline | | Blue. |
| Do | 1,4-naphtholsulfonic acid | Violet. |
| Do | 1-benzoylamino-8-hydroxynaphthalene-3,6-disulfonic acid | Do. |
| Do | 1-(2'-naphthyl)-3-methyl-5-pyrazolone-4',8'-disulfonic acid | Green. |
| 2,5-dimethoxyaniline | | Violet |
| Do | 1-benzoylamino-8-hydroxynaphthalene-3,5-disulfonic acid | Do. |
| Do | 1,4-naphtholsulfonic acid | Do. |
| Do | 1-(2'-naphthyl)-3-methyl-5-py razolone-4',8'-disulfonic acid | Brown. |
| Para-chloraniline | | Bluish red. |
| Do | 1,4-naphtholsulfonic acid | Red. |
| Do | 1-benzoylamino-8-hydroxynaphthalene-3,6-disulfonic acid | Bluish red. |
| Do | 1-(2'-naphthyl)-3-methyl-5-pyrazolone-4',8'-disulfonic acid | Red. |
| Meta-toluidine | | Bluish red. |
| Do | 1,4-naphthol-sulfonic acid | Red. |
| Do | 1-benzoylamino-8-hydroxynaphthalene-3,6-disulfonic acid | Bluish red. |
| Do | 1-(2'-naphthyl)-3-methyl-5-pyrazolone-4',8'-disulfonic acid | Red. |

*Example 52*

40 parts of an aqueous solution of 7% strength of a water-soluble dyestuff product prepared as described in Examples 6 or 50 are stirred into 1175 parts of a viscose xanthate solution of 8.5% α-cellulose, corresponding to 100 parts of the fiber forming material. The mixture is stirred for ½ hour and then deaerated for 5 hours under reduced pressure.

In the manner conventionally used for the manufacture of viscose rayon or staple, the viscose mass is then extruded through spinnerets and coagulated at 45° C. in a coagulating bath containing per liter: 120 grams of sulfuric acid of 96% strength, 270 grams of sodium sulfate and 10 grams of zinc sulfate.

The filaments obtained in this manner are stretched by 25% and collected in a spinning pot rotating at 6000 revolutions per minute.

The resulting spinning cake is after-treated in a closed apparatus through which liquor circulates, being first rinsed for 10 minutes with water at 70° C., then desulfurized for 20 minutes with a solution of 5 grams of sodium sulfite per liter of water, and then being scrooped for 10 minutes at 50° C. with a solution of 50 grams of sodium oleate per liter of water.

The precipitation and after-treatment baths are at most only faintly tinted.

Perfect dyeings are obtained which are fast to washing and abrasion and have good transparency.

As will be readily apparent to those skilled in the art, to which the invention pertains, the details of the above process may be varied without departing from the scope of the present invention. Thus, depending on the tinctorial strength desired, from about 10 to about 100 parts of an aqueous solution of from about 2% to about 10% strength of a water-soluble dyestuff prepared in accordance with the procedure of any of the examples may be employed.

Example 53

5 parts of the dyestuff preparations obtained as described in Example 19 are allowed to swell for 2 hours in 55 parts of cold water. 40 parts of sodium hydroxide solution of 15% strength are then added, and the whole is stirred until a viscous solution has formed.

Cotton fabrics are padded with this solution, the fabric is then after-treated in a bath containing 5% of sulfuric acid and 5% of sodium sulfate, thoroughly rinsed in cold and then in hot water and soaped at the boil. The fabric display a level tint.

Similarly good results are obtained on fabrics of glass, polyester, polyacrylonitrile, polyamide, acetate or triacetate fibers.

Example 54

25 parts of an insoluble dyed product that does not swell in water and prepared, for instance as described in Example 39, are mixed with 225 parts of water and ground in a ball mill, swing mill or a similar apparatus until the particles have a size of 5 microns or less. The resulting paste can be used, for instance, for spin-dyeing viscose as described in Example 55.

Example 55

10 to 100 parts of an aqueous solution of 2 to 10% strength of a water-soluble dyed product prepared as described, for instance, as described in Example 32 or 33, or 10 to 100 parts of a solution of 2 to 10% strength of a dyed product which is soluble in sodium hydroxide solution of 6 to 8% strength, obtained as described in Example 53; or 10 to 100 parts of the dye paste prepared as described in Example 54, are stirred (depending on the desired tinctorial strength) into 1175 parts of a viscose xanthate solution of 8.5% α-cellulose corresponding to 100 parts of the fiber forming material. The whole is stirred for ½ hour and during 5 to 6 hours deaerated under reduced pressure.

As is the usual practice in the manufacture of viscose rayon or staple, the viscose mass is then extruded through spinnerets and coagulated at a temperature of 45° C. in a coagulating bath containing per liter: 120 grams of sulfuric acid of 96% strength, 270 grams of sodium sulfate and 100 grams of zinc sulfate.

The filaments obtained in this manner are stretched to 125% of their initial length and collected in a spinning pot rotating at 6000 revolutions per minute.

The resulting spinning cake is after-treated in a closed apparatus through which the liquor circulates, first for 10 minutes with rinse water at 60 to 75° C., then desulfurized for 20 minutes at 70° C. with a solution of 5 grams of sodium sulfite per liter, and then scrooped for 10 minutes at 50° C. with 50 grams of sodium oleate per liter.

The precipitation and after-treating baths are colorless or at most only very slightly tinged.

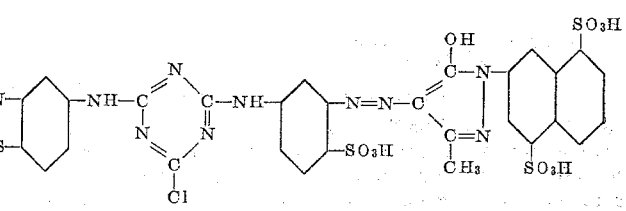

The resulting dyeings are of good transparency and perfectly fast to washing and abrasion.

What is claimed is:

1. A dyestuff consisting of a member selected from the group consisting of a radical of a water-soluble reactive oxazine dyestuff, triphenylmethane dyestuff, xanthene dyestuff, nitro dyestuff, acridone dyestuff, anthraquinone dyestuff, azo dyestuff, phthalocyanine dyestuff and peri-dicarboxylic acid imide dyestuff, said radical being bound via bridge radical to the carbon atoms of a polyhydroxylated organic polymer selected from the group consisting of a water- or alkali-soluble cellulose ether, a water, or alkali-soluble cellulose ester, polyvinyl alcohol, a water- and alkali-insoluble cellulose ether, a water- and alkali-insoluble cellulose ester, a water- and alkali-insoluble starch, dextrine, sodium alginate, gum arabic and guaran, said bridge radical, inclusively of the oxygen atoms of the polyhydroxylated polymer, being a member selected from the group consisting of an aminotriazinyloxy radical, an aminopyrimidyloxy radical, an aminophthalazinyloxy radical, an aminochinazolinyloxy radical, an aminochinoxalinyloxy radical and a radical of the formula

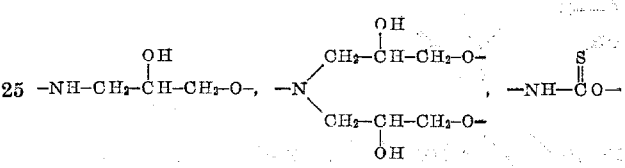

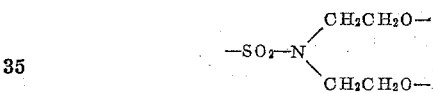

2. A dyestuff as claimed in claim 1, in which the radical of the said polymer contains only carbon oxygen and hydrogen atoms.

3. A dyestuff consisting of the radical of monoazo dyestuff sulfonic acid chemically bound via an amino triazinyloxy linkage to an alkali-to water-soluble cellulose alkyl ether.

4. A dyestuff comprising 10–400% of a monoazo dyestuff sulfonic acid chemically bound via a bridge radical to the carbon atoms of an alkali- or water-soluble cellulose ether selected from the group consisting of methyl-, ethyl-, hydroxyethyl- and carboxymethyl cellulose, said bridge radical, inclusively of the oxygen atoms of the cellulose ether, being an aminotriazinyloxy radical.

5. A dyestuff consisting of the radical of the monoazo-dyestuff of the formula

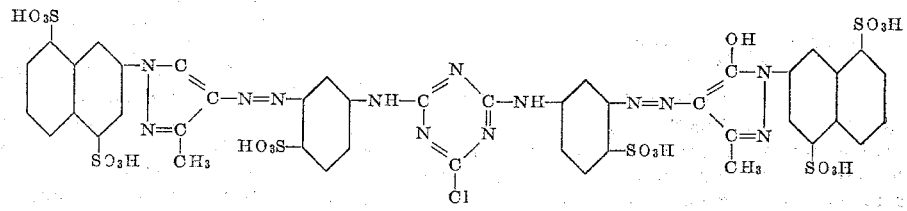

chemically bound via an ether linkage to dextrine.

6. A dyestuff consisting of the radical of the monoazo-dyestuff of the formula

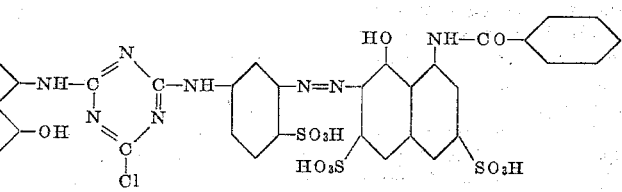

chemically bound via an ether linkage to dextrine.

(References on following page)

References Cited by the Examiner

UNITED STATES PATENTS

| | | | |
|---|---|---|---|
| 1,886,480 | 11/1932 | Haller et al. | 260—153 |
| 1,973,478 | 9/1934 | Granacher et al. | 260—152 X |
| 2,136,377 | 11/1938 | Dinklage | 260—152 |
| 2,138,553 | 11/1938 | Muth et al. | 260—152 X |
| 2,139,787 | 12/1938 | Wingler et al. | 260—152 X |
| 2,741,532 | 4/1956 | Guthrie | 260—197 X |

FOREIGN PATENTS

| | | |
|---|---|---|
| 226,210 | 12/1959 | Australia. |
| 566,099 | 9/1958 | Belgium. |
| 398,279 | 9/1933 | Great Britain. |

OTHER REFERENCES

Dorset, "The Textile Manufacturer," vol. 84, No. 11, pp. 522–526 (October 1958).

Schlaeppi, "American Dyestuff Reporter," pp. 377–383 (June 2, 1958).

Wegmann, "The Textil-Praxis," p. 1056 (October 1958).

CHARLES B. PARKER, *Primary Examiner.*

JOSEPH P. BRUST, *Examiner.*

REYNOLD FINNEGAN, DONALD M. PAPUGA,
*Assistant Examiners.*